April 16, 1929.    M. M. METZINGER    1,709,677
CAP FOR TIRE VALVE TUBES
Filed Oct. 3, 1927

Myron M. Metzinger, Inventor

By David O. Barnell
Attorney

Patented Apr. 16, 1929.

1,709,677

UNITED STATES PATENT OFFICE.

MYRON M. METZINGER, OF BLAIR, NEBRASKA.

CAP FOR TIRE-VALVE TUBES.

Application filed October 3, 1927. Serial No. 223,765.

My invention relates to caps for the valve-tubes of pneumatic tires, and it is the general object thereof to provide a simple, efficient and inexpensive device of this kind, adapted to hold or retain air-pressure within the tire regardless of leakage through the valve itself. A more particular object of my invention is to provide a tire valve tube cap having a seat or gasket of soft metal instead of rubber or other non-metallic packing material, to provide means for retaining the metal seat or gasket within the cap, and to provide means for preventing destructive deformation of the soft metal seat or gasket by the pressure of the tube-end thereon.

Figure 1:
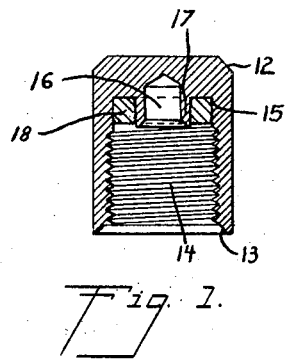
Figure 2:
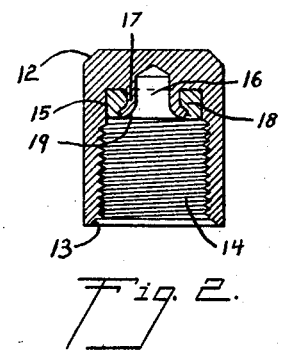
Figure 3:
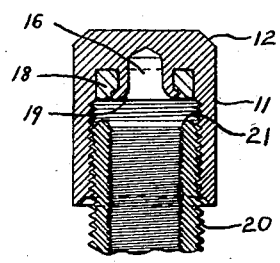
Figure 4:
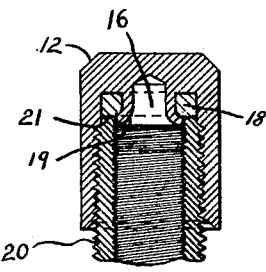
Figure 5:
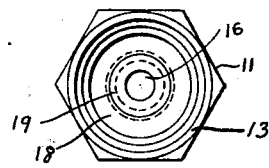
Figure 6:
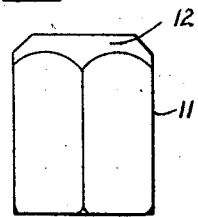
Figure 7:
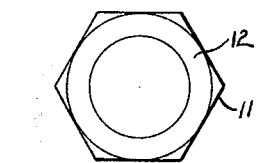

In the accompanying drawings Fig. 1 is a longitudinal section of a partially completed cap embodying my invention, Fig. 2 is a similar view of the completed cap, Fig. 3 is a longitudinal section of the cap as screwed partly onto the valve-tube, Fig. 4 is a similar view showing the cap fully seated upon the tube, Fig. 5 is a bottom view of the cap, Fig. 6 is a side view of the same, and Fig. 7 is a plan view thereof.

In carrying out my invention I preferably form the cap from a piece of hexagonal rod which is cut to a suitable length for the body 11, the closed end being slightly rounded at the edges 12, and the other end being formed with a short conical countersink 13 extending to the threaded bore 14. At the inner end of the threaded bore 14 there is formed an annular groove 15 which originally is rectangular in section as shown in Fig. 1, and has an outer diameter slightly less than the root diameter of the threads 14. At the center of the closed end of the cap is drilled a hole 16, slightly greater in depth than the groove 15, and between said hole and groove there is an annular flange 17. Within the groove 15 is disposed a ring 18 of soft metal, such as lead, the thickness of said ring being slightly less than the depth of the groove, so that the flange 17 extends slightly beyond the end of the ring at the open end of the groove, as shown in Fig. 1. After the soft metal ring has been seated in the groove, the end portion of the flange 17 is expanded or swaged outwardly, to form an annular curved lip 19 overlying the inner portion of the ring 18, the ring itself being at the same time slightly upset radially and elongated axially, and a flat annular face of the soft metal being left exposed outwardly of the lip 19, as shown in Fig. 2. The soft metal ring is thus firmly secured in the annular groove at the end of the cap, and is also compressed or consolidated by the swaging pressure exerted thereon by the expanding of the flange, whereby any sponginess or lack of solidity of the soft metal will be obviated.

In the ordinary standard valve-tube, commonly provided for pneumatic tires, the end portion of the tube 20 is threaded externally to receive the cap, and is threaded internally to receive the removable valve structure, the end of the tube intermediate the roots of the external and internal threads being rounded to an annular ridge 21, as best shown in Fig. 3. The threaded bore 14 of my improved cap is adapted to screw onto the external threads of the tube 20 in the usual manner, and the outer diameter of the lip 19 is such that said lip may pass inside the ridge 21 at the end of the valve-tube, although with very slight clearance between them. Thus when the cap is screwed down firmly onto the end of the valve-tube 20, the ridge 21 engages only the exposed end-surface of the soft metal ring 18 and becomes bedded into said surface as shown in Fig. 4, to form a substantially perfect air-tight joint capable of resisting great air-pressure without leakage. Undue deformation or displacement of the soft metal from the groove 15 is prevented by the confinement thereof at all sides, except at the slight clearance-space between the lip 19 and the inner edge of the ridge 21, and this space is too narrow to allow any appreciable extrusion of the soft metal by the pressure resulting from screwing down the cap sufficiently to retain the air. The surface of the soft metal engaged by the ridge 21 becomes burnished or polished by its contact with the ridge, and the wear of the contacting surfaces, by repeated removal and replacement of the cap, is so small as to be negligible. The hole 16 within the annular flange 17 provides for the usual projection of the valve-stem (not shown) to a point beyond the end of the valve-tube 20.

Now, having described my invention, what I claim and desire to secure by Letters Patent is:

1. A valve-tube cap comprising a body-member having a threaded portion for engaging the screw threads of a valve-tube, and having an annular groove adjoining the end of said threaded portion, a soft metal ring disposed in said groove, and an annular lip integral with the body-member and extending partially over the face of said ring to retain the same in the groove and to inhibit extrusion of the soft metal from the groove by pressure of the end of the valve-tube thereon.

2. A valve-tube cap comprising a cup-shaped member internally threaded to engage the screw-threads of a valve-tube, and having within the closed end thereof an integral annular flange, there being a central recess inside and an annular groove outside said annular flange, and a soft metal ring disposed in said annular groove and retained therein by expansion of the end portion of the annular flange partially thereover, the exposed surface of the soft metal ring being adapted for engagement with the end of the valve-tube when the cap is screwed thereon.

MYRON M. METZINGER.